(12) United States Patent
Dougherty

(10) Patent No.: US 9,133,630 B2
(45) Date of Patent: Sep. 15, 2015

(54) FASTENER ANCHOR REPAIR SYSTEM AND METHOD

(71) Applicant: Dean Dougherty, Sparks, NV (US)

(72) Inventor: Dean Dougherty, Sparks, NV (US)

( * ) Notice: Subject to any disclaimer, the term of this patent is extended or adjusted under 35 U.S.C. 154(b) by 0 days.

(21) Appl. No.: 14/306,212

(22) Filed: Jun. 16, 2014

(65) Prior Publication Data

US 2014/0366482 A1      Dec. 18, 2014

Related U.S. Application Data

(60) Provisional application No. 61/835,284, filed on Jun. 14, 2013.

(51) Int. Cl.
  *E04F 21/00*    (2006.01)
  *F16B 35/04*    (2006.01)
  *F16B 13/12*    (2006.01)

(52) U.S. Cl.
  CPC ........... *E04F 21/0007* (2013.01); *F16B 13/128* (2013.01)

(58) Field of Classification Search
  CPC ........................... E04F 21/0007; F16B 13/128
  USPC ............. 52/514, 765, 215, 213, 210, 71, 698, 52/701, 705; 411/178, 80.6; 248/231.91
  See application file for complete search history.

(56) References Cited

U.S. PATENT DOCUMENTS

| | | | | |
|---|---|---|---|---|
| 1,646,431 A | * | 10/1927 | Tomkinson | 411/19 |
| 2,042,246 A | * | 5/1936 | Bailey | 52/202 |
| 3,339,952 A | * | 9/1967 | Beckman | 403/282 |
| 3,667,338 A | * | 6/1972 | Johansson | 411/378 |
| 3,685,226 A | * | 8/1972 | Richter | 52/217 |
| 3,859,764 A | * | 1/1975 | Cary | 52/217 |
| 3,888,156 A | | 6/1975 | Fima | |
| 3,942,407 A | | 3/1976 | Mortensen | |
| 4,118,827 A | * | 10/1978 | Yamamoto | 16/252 |
| 4,263,832 A | | 4/1981 | Lang | |
| 4,422,813 A | | 12/1983 | Greenbaum | |
| 4,486,134 A | * | 12/1984 | White | 411/103 |
| 4,601,625 A | * | 7/1986 | Ernst et al. | 411/387.4 |
| 4,654,929 A | | 4/1987 | Fahnders et al. | |
| 4,720,224 A | | 1/1988 | Peterken | |
| 4,782,677 A | | 11/1988 | O'Gara | |
| 4,825,509 A | | 5/1989 | Mitchell et al. | |
| 4,828,439 A | | 5/1989 | Giannuzzi | |

(Continued)

FOREIGN PATENT DOCUMENTS

JP              06241219 A  *  8/1994  ............. F16B 39/30

*Primary Examiner* — Brent W Herring
(74) *Attorney, Agent, or Firm* — John D. Long, Esq; Long & Chybik

(57) ABSTRACT

The invention could be a repair system and method for re-securing doors to their respective door frames when a screw fastener that originally used to secure the door to the respective door frame no longer engages and secures to the screw fastener's original screw hole in the door or frame, comprising a fastener anchor comprising a double open-ended hollow cylinder having a threaded exterior side and a hollow interior, the hollow interior forming a threaded lengthwise center channel that is continuously connected to the two open ends, one open end being tapered while the remaining other open end being shaped to receive a portion of a rotating instrument; a securing fastener having a threaded portion that can removably engage the threaded lengthwise center channel; wherein the threaded exterior side is capable of engaging and securing to the respective screw hole after the screw hole has been enlarged.

17 Claims, 9 Drawing Sheets

(56) References Cited

U.S. PATENT DOCUMENTS

| | | | |
|---|---|---|---|
| 4,883,396 A | 11/1989 | Shamah | |
| 4,906,148 A | 3/1990 | Schule | |
| 4,912,809 A | 4/1990 | Scheuer | |
| 4,941,252 A | 7/1990 | Haisch | |
| 5,044,849 A | 9/1991 | Starke | |
| 5,160,225 A * | 11/1992 | Chern | 411/30 |
| 5,163,775 A | 11/1992 | Rowan, Jr. | |
| 5,174,703 A * | 12/1992 | White | 411/107 |
| 5,234,299 A * | 8/1993 | Giannuzzi | 411/31 |
| 5,241,790 A * | 9/1993 | Schimpf | 49/504 |
| 5,248,232 A * | 9/1993 | Chiang | 411/237 |
| 5,375,296 A | 12/1994 | Zaleskie | |
| 5,509,765 A | 4/1996 | Albin | |
| 5,536,121 A * | 7/1996 | McSherry | 411/31 |
| 5,653,074 A * | 8/1997 | Yoon | 52/210 |
| 5,690,454 A | 11/1997 | Smith | |
| 5,779,410 A | 7/1998 | Lautenschlager | |
| 5,953,879 A | 9/1999 | Fischer | |
| 6,048,149 A | 4/2000 | Garcia | |
| 6,178,700 B1 * | 1/2001 | Mayer, Jr. | 49/504 |
| 6,216,316 B1 | 4/2001 | Errichiello | |
| 6,347,496 B1 | 2/2002 | Pinkins | |
| 6,361,087 B1 | 3/2002 | Collet | |
| 6,679,661 B2 * | 1/2004 | Huang | 411/29 |
| 6,929,424 B2 | 8/2005 | Hindle | |
| 6,969,220 B2 | 11/2005 | Anquetin | |
| 7,127,775 B2 | 10/2006 | Ferre | |
| 7,144,212 B2 * | 12/2006 | Kaye et al. | 411/30 |
| 7,210,885 B2 | 5/2007 | Pinzl | |
| 7,261,505 B2 * | 8/2007 | Ernst et al. | 411/35 |
| 7,290,972 B2 * | 11/2007 | Gauthier | 411/387.1 |
| 7,516,518 B2 | 4/2009 | Kiefer | |
| 8,038,375 B2 | 10/2011 | Kohan | |
| 8,128,329 B2 | 3/2012 | Pilon | |
| 8,393,253 B2 | 3/2013 | Johnson | |
| 8,404,065 B2 | 3/2013 | Miller | |
| 2003/0138306 A1 | 7/2003 | Wallace | |
| 2004/0098940 A1 | 5/2004 | Latessa | |
| 2006/0120822 A1 * | 6/2006 | Kaye et al. | 411/30 |
| 2006/0127199 A1 * | 6/2006 | Bappert | 411/411 |
| 2008/0127606 A1 * | 6/2008 | Kuroiwa | 52/784.14 |
| 2009/0074533 A1 * | 3/2009 | Kucharyson | 411/31 |
| 2010/0239384 A1 | 9/2010 | Lu | |
| 2012/0308326 A1 | 12/2012 | Gillis | |
| 2012/0321411 A1 | 12/2012 | Podesser | |

* cited by examiner

FASTENER ANCHOR REPAIR SYSTEM AND METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may relate to those repair systems for re-securing doors to their respective frames when screw fasteners that ordinarily connect such doors to their frames no longer engage and attach to stripped-out screw holes in the doors or frames. More specifically, the present invention may related to relate to such repair systems that repair the stripped-out screw holes with threaded inserts to allow a fastener to engage and attach to the screw holes as repaired.

BACKGROUND

In older construction practices when a hinged door was desired to applied to a room, the studs in room's wall construction were arranged to create a doorway, substantially an opening or egress into the room, between rooms, closet or like. Additional materials (generally wood) were further selected, measured, cut and installed within the doorway to form a frame that could movably hold (e.g., by hinges) the door. A door was then selected and then subsequently movably attached to the frame by screw fasteners (e.g., the door and frame generally acting as anchoring bases for the screw fasteners). In many instances of such construction, one or more of the screw fasteners attaching the hinges to the frame not only penetrated into the frame but moved further into the studs that formed the doorway to firmly securing the hinge(s) to the frame.

In more modern times, the prefabricated method of door construction, which provides a saving of time and money over the older methods of doorway construction, has the door and frame generally being simultaneously constructed and then attached together according to industry-standardized dimensions. Once a building's doorway is constructed, then a previously selected prefabricated door/frame is inserted into the doorway and with appropriate screw fasteners that attach the doorframe to studs composing the doorway. In such instances, the screw fasteners used to originally attach the door to the frame are not the screw fasteners used for subsequent attachment of the frame to the doorway. Further, such prefabricated door/frames generally used screw fasteners that attach the hinges to the frame that do not pass beyond the frame into the studs (thus allowing the frame to be fitted to the doorway in the first place.) Generally is using such small length screw fasteners (that do not fully penetrate the door frame) for frame-based hinge attachment, these screw fasteners may lack sufficient attachment interaction with the frame to attach and hold the respective hinge to the frame for long term usage. Over a period of time, the door weight and opening/closing door movement acting upon the respective hinge may loosen or pull out the hinge screw fastener(s) altogether from the prefabricated frame/door.

In such instances, the diameter of the screw hole may have been worked over time to be larger than the diameter of the respective stripped-out screw fastener. If the screw fastener is then subsequently inserted back into the respective screw hole, the respective screw hole may be too large for the screw fastener to re-attach the frame or like with sufficient fastening capacity to hold the hinge in place. The result could be a door that no longer opens and closes properly (e.g., the door could sag in alignment to the frame.)

This issue could also arise in other door-associated construction, namely storage cabinets and the like as commonly found in kitchens and other areas of a building, as well as gates and fences, and the like. In these types of door/gate-associated construction, their building costs may be reduced by the incorporation of wood fiber products (e.g., fiber board), wood laminates and the like which may have less fastener holding capacity (softer) than older plain types of wood products. Similarly, the action and weight of the doors over time may work loose the screw fasteners holding on the hinges to the door and/or the frame. This consequence could eventually cause the door to sag in relation to the frame/cabinet, also preventing the cabinet door from properly closing or opening all the way.

A common repair technique for fixing a door/frame stripped-out screw hole could involve the use of adhesive and repair material to file in the screw hole to make the stripped-out screw hole's diameter small enough to allow the stripped-out or loosely held screw fastener's thread to re-engage it in a secure a manner. In this context, the term "stripped-out screw fastener" does not mean that the screw fastener itself has lost its threads, rather that the action upon the screw fastener has made its respective screw hole stripped-out or enlarged. The start of such a repair technique could be the removal of the stripped-out screw fastener (if it has not already fallen out.) The corresponding hinge could be also removed from the effected attachment site (e.g., the frame or the door) to allow clear access to the stripped-out screw hole. A suitable adhesive (e.g., a white water-based glue or a silicone caulk) may then be inserted/injected into the stripped-out screw hole along with suitable reinforcement materials (e.g., wood such as tooth picks or other such materials) to decrease or otherwise generally restore the original diameter of the stripped-out screw hole to allow the stripped-out screw fastener to be successfully re-anchored into the repaired screw hole.

This repair procedure may be seen as have several drawbacks. The repair procedure could take several hours to complete (and hence result in increased repairman costs and times) depending on how long the adhesive or silicone caulk takes to cure. Also, this repair reinforcement may also require the repaired/reduced screw hole to be re-centered and re-drilled, which if not carefully done may cause the screw hole to be off-center to the respective hole in the hinge that goes over the screw hole.

What could be needed is a new repair system and method of re-securing screw fasteners being used to secure a door to a respective frame once the screw fastener has outstripped its respective screw hole. Such a repair system could comprise a fastener anchor and a securing fastener. The fastener anchor could be a double open-ended hollow cylinder, the two open ends continuously connecting a threaded lengthwise center channel. One open end could be tapered while the other open end could be flat and further shaped to removably receive a portion of a driving instrument like a hex head wrench, a screw driver or the like that can be used to rotate the fastener anchor into the screw hole. The outside length of the cylinder could be threaded as well to engage the screw hole.

The securing fastener have a head connected to a threaded portion whose thread substantially reciprocally or complementarily corresponds to the thread of the threaded lengthwise center channel. The head could also be adapted to removably receive a portion of a driving instrument like a hex head wrench, a screw driver or the like that can be used to rotate the securing fastener into the fastener anchor.

The method of using this repair system could start with the removal of the original screw fastener from the respective stripped-out screw hole. A drill with an appropriate drill bit or reamer whose size substantially matches the external diameter of the cylinder (minus the external thread) could be used to drill or ream out the original screw hole to accept the fastener anchor. The tapered open end of the hollow cylinder could be inserted first into the drilled-out screw hole while a driver instrument (e.g., a hex key or Allen wrench) could be attached to the other open end. The rotating or driver instrument could then be used to rotate the fastener anchor into the resized screw hole so that the external side threads could bite into and engage the door or frame generally surrounding and defining the screw hole. The fastener anchor is substantially rotated (also by a rotating instrument) into generally solid attachment with door or frame until the second open end is flush with the surface of the door or frame. The hinge could then be replaced over the fastener anchor and the securing fastener be inserted through the hinge to engage the fastener anchor's threaded lengthwise center channel. The securing fastener is then rotated into the fastener anchor until the hinge is properly re-attached to the door or frame to properly and fully re-securing the door and frame back together. This new repair system and method could be used for room doors/frames, cabinet doors and frames; gates and fences; and any other structure that have may have a hinge generally attached to wood product.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to repair a overly enlarged screw hole for a screw fastener used to secure a door and frame together;

provide a door/frame repair system and a corresponding method for fixing pulled out/stripped-out fastener screws in less time than traditional means to affect such repairs;

the ability to lessen the probability that a repaired screw hole for a door/frame will again be stripped-out by its respective screw fastener;

provide a repair of a door and frame with a stripped-out screw fastener hole that augments and strengthens the stripped hole to generally allow the original screw fastener to be reused to secure the door and frame together; and These and other advantages may be realized by reference to the remaining portions of the specification, claims, and abstract.

Brief Description of One Embodiment of the Present Invention

One possible embodiment of the invention could be a repair system for re-securing doors to their respective frames when a screw fastener that originally used to secure the door to the respective frame no longer engages and secures to the screw fastener's screw hole in the door or frame, comprising: a fastener anchor comprising a double open-ended hollow cylinder having a threaded exterior side, a hollow interior and two ends, the hollow interior further forming a threaded lengthwise center channel that is continuously connected to the two ends, one open end being tapered while the remaining other open end being shaped to receive a portion of a rotating instrument; a securing fastener having a threaded portion that can engage the threaded lengthwise center channel to re-secure the door to its respective frame; wherein the threaded exterior side is capable of engaging and securing to the screw fastener's screw hole after the screw hole has been appropriately enlarged.

Another possible embodiment of the invention could be a method of using a repair system for fully re-securing a door to a frame when a screw fastener that originally used to secure the door to the respective frame no longer engages and secures to the screw fastener's screw hole in the door or frame, comprising the following steps, but not necessarily in the order shown, providing a door movably attached to a frame by screw fasteners, one or more of the screw fasteners no longer attaching to a respective screw hole in an frame or door; providing a fastener anchor comprising a double open-ended hollow cylinder having a threaded exterior side, a hollow interior, and two open ends, the hollow interior further forming a threaded lengthwise center channel that is continuously connected to the two open ends, one open end being tapered while the remaining other open end being shaped to receive a portion of a rotating instrument; enlarging the screw hole to accommodate the fastener anchor; rotating the fastener anchor into the enlarged screw hole; and inserting a securing fastener into the threaded lengthwise center channel to fully re-secure the door to the respective frame.

Yet another possible embodiment of the invention could be a combination of a door, a frame and a repair system for re-securing doors to their respective door frames, comprising: the door movably attached to the frame by one or more screw fasteners, one of the one or more screw fasteners no longer engaging and securing to a respective screw hole in either the frame or door; a fastener anchor comprising a double open-ended hollow cylinder having a threaded exterior side, a hollow interior and two open ends, the hollow interior further forming a threaded lengthwise center channel that is continuously connected to the two open ends, one open end being tapered while the remaining other open end being shaped to receive a portion of a rotating instrument; a securing fastener having a threaded portion that can engage the threaded lengthwise center channel; wherein the threaded exterior side is capable of engaging and securing to the respective screw hole after the respective screw hole has been appropriately been enlarged to receive the fastener anchor, the securing fastener capable of engaging the threaded lengthwise center channel to re-secure the door to its respective frame.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
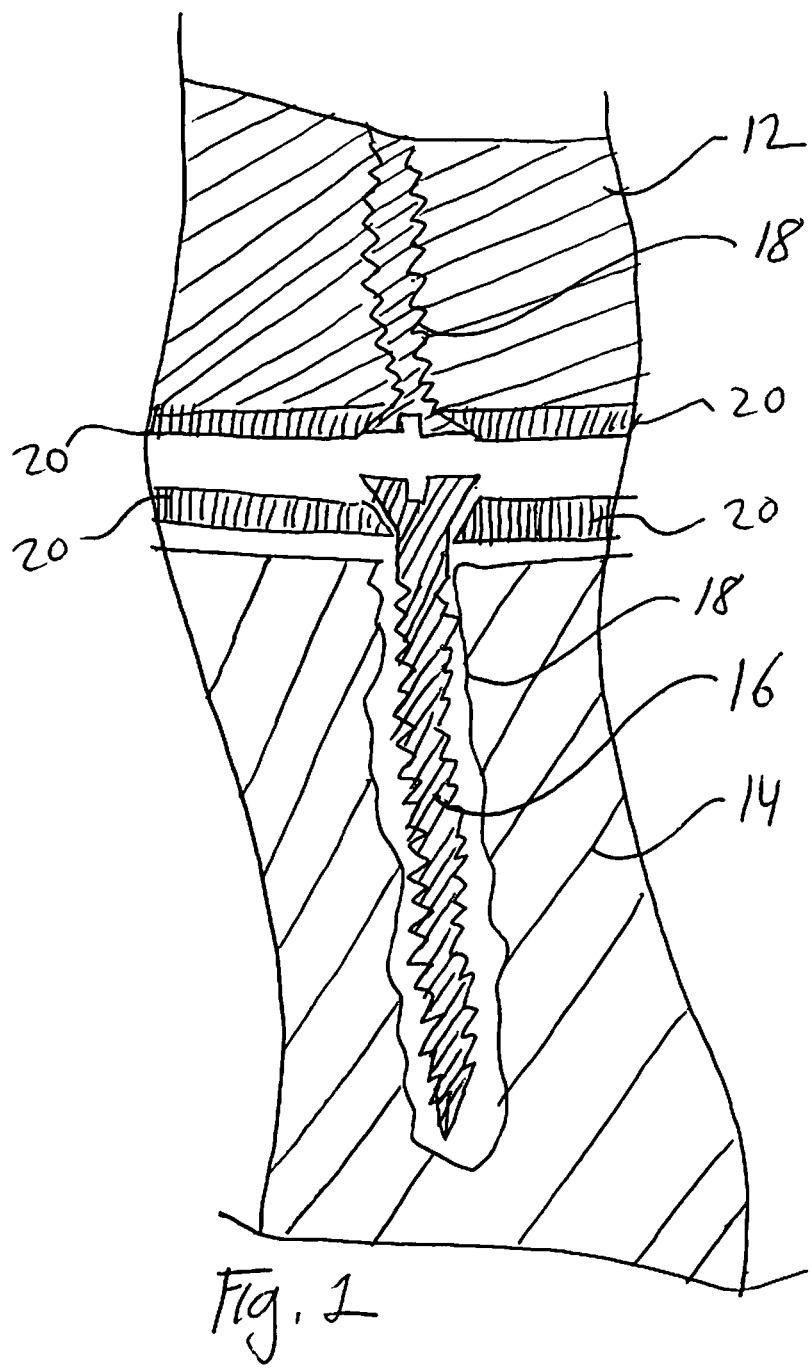
FIG. 1 is substantially a cutaway elevation view of screw fastener for a door/frame in a respectively enlarged or stripped out hole . . . .
Figure 2:
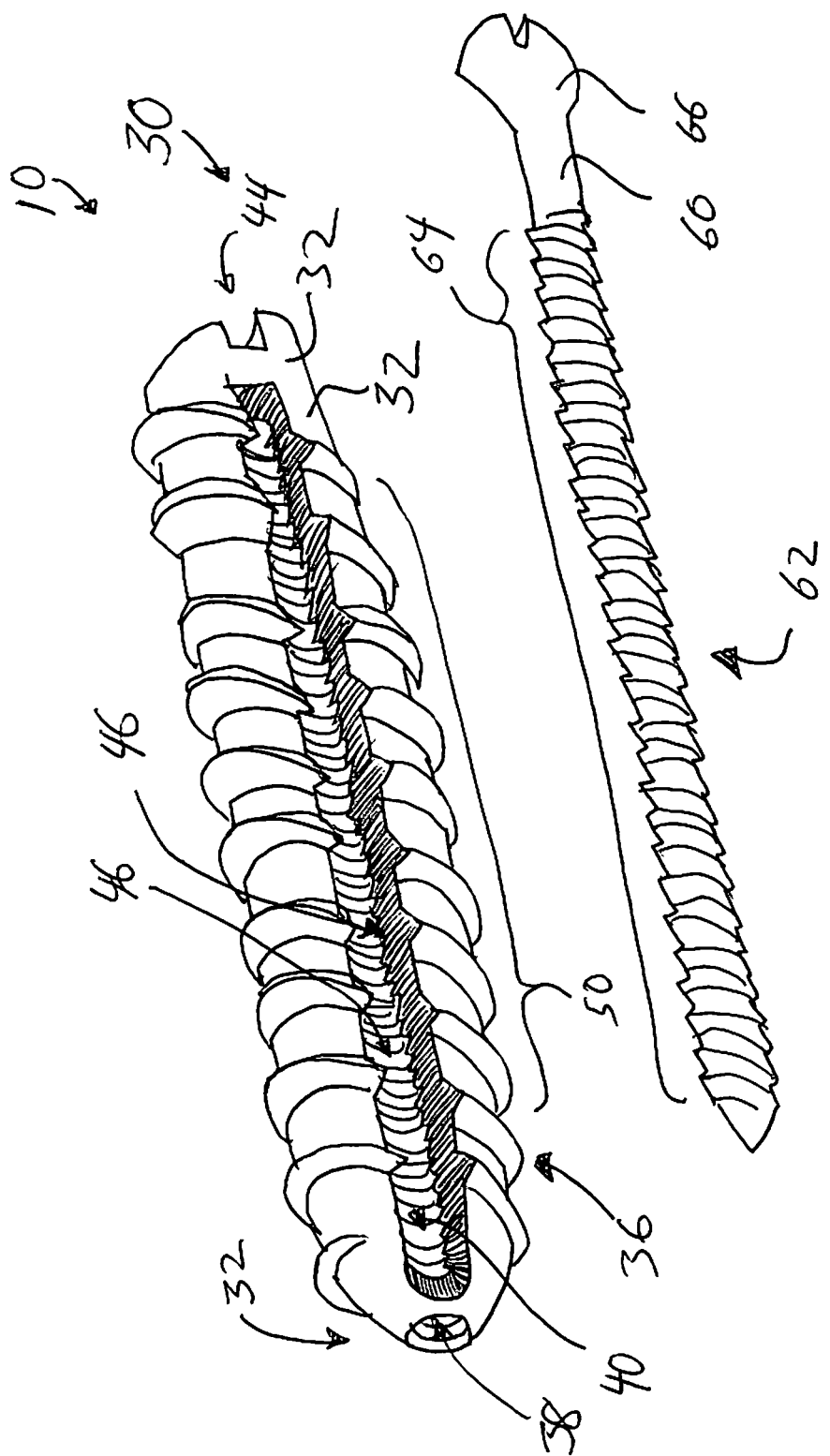
FIG. 2 is substantially showing a perspective cutaway of one embodiment of the securing fastener and the fastener anchor of the present invention.
Figure 7:
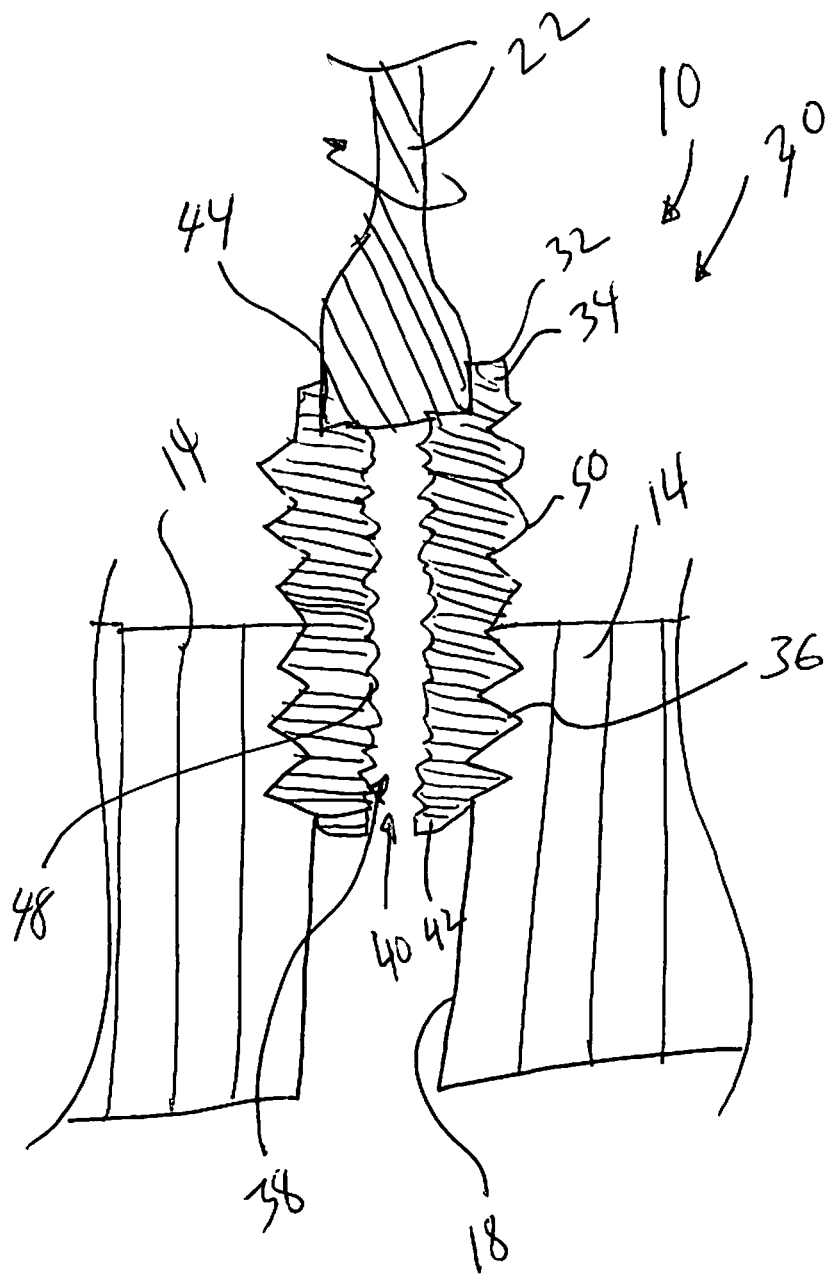
FIG. 7 is substantially showing a cutaway elevation drawing showing the insertion of the fastener anchor into the enlarged stripped out screw hole.
Figure 8:
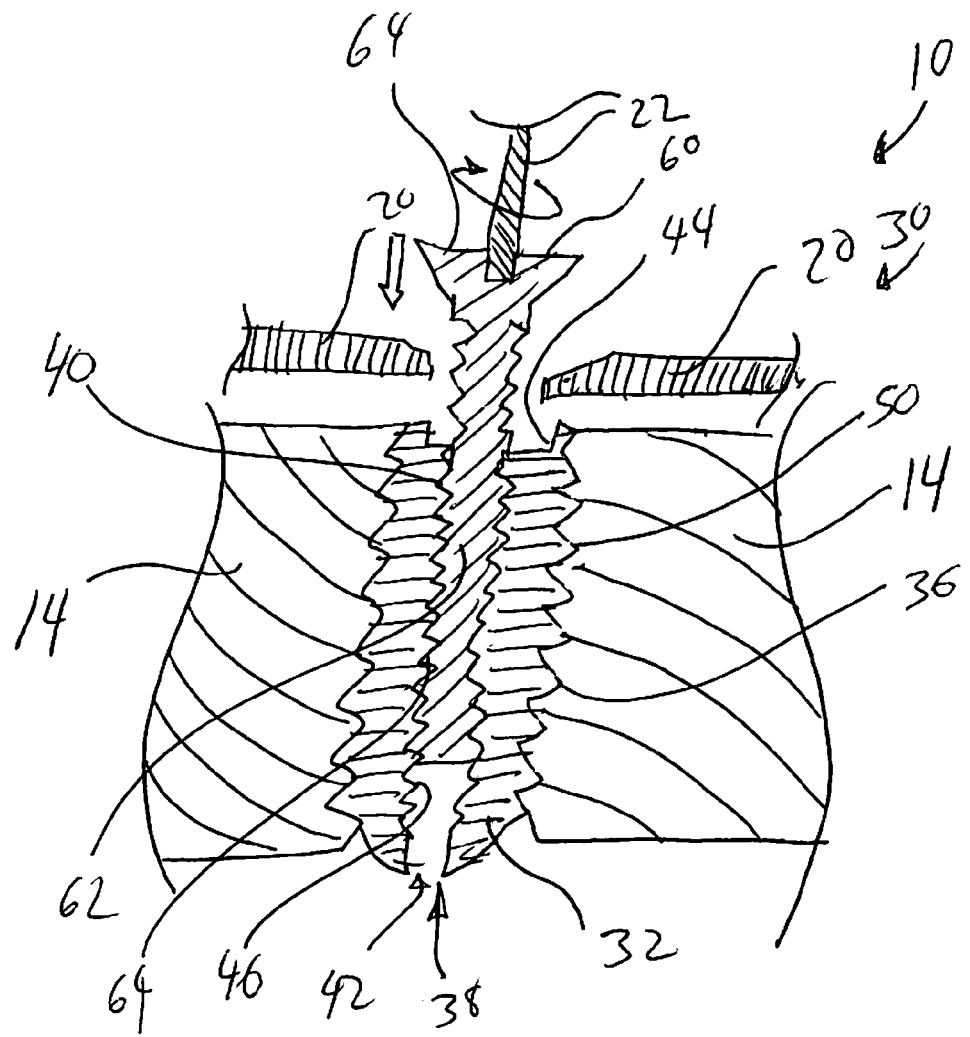
FIG. 8 is substantially showing a cutaway elevation drawing showing the insertion of the securing fastener into the secured fastener anchor.
Figure 9:
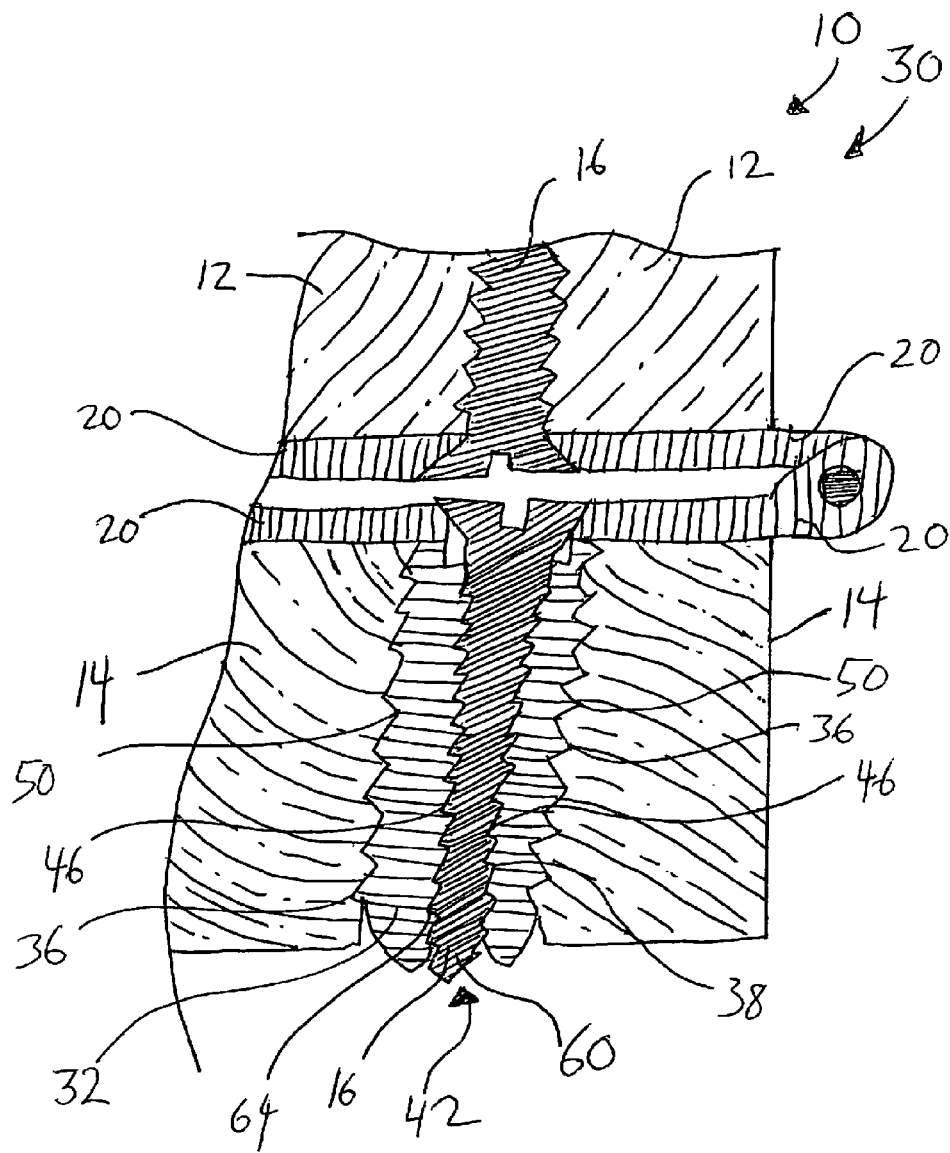
FIG. 9 is substantially showing a cutaway elevation drawing showing the securing fastener securing the door to the frame.

As substantially shown in FIG. 1, the present invention could address the situation wherein screw fasteners 16 used to hold doors 12 to their respective frames 14 (e.g., cabinet door to cabinets, gates to fences, etc.) once those screw fasteners 16 holding the door 12 to the frame 14 have outstripped the respective screw holes 18 in the door 12 or frame 14 substantially preventing the stripped-out screw fastener 16 from attaching to the door 12 or frame 14 (e.g., via a hinge 20). As shown substantially in FIG. 2, the invention 10 could be a repair system 30 that could comprise a securing fastener 60 that could attach to a fastener anchor 32. The fastener anchor 32 could comprise a double-ended hollow cylinder 34 that could be constructed from a variety of materials as appropriately selected by on with skill in the art (e.g., a resilient polymer, resin, metal, etc.) The hollow cylinder 34 could have a threaded exterior side 36 and a hollow interior 38. The hollow interior 38 could further form a threaded lengthwise center channel 40 that is continuously connected to the two ends, a tapered end 42 that could be open while the remaining other open end 44 being shaped to receive a portion of a rotating instrument 22 (substantially shown in FIG. 7.)

A thread of threaded lengthwise center channel or channel thread 46 in at least one embodiment of the invention 10 could be complementary or reciprocal to a thread 64 of a threaded portion 62 of the securing fastener 60 to allow the securing fastener 60 to substantially engage and screw into the fastening anchor 32 without deforming the channel threads 46. In one such version, the channel thread 46 could be complementary or reciprocal to the stripped-out or stripped-out screw fastener 16 (substantially shown in FIG. 1) that was originally stripped-out of the screw hole 18 (as substantially shown in FIG. 1) that is repaired by the invention 10. This capability could allow the stripped-out screw fastener 16 could be used as the securing fastener 60. Although this version could provide the convenience of using the stripped-out screw fastener 16, the screw fastener may be considered a wood screw having a spaced apart thread that is used in attaching to wood composed structures. If used in a metal-composed structure (e.g., the fastener anchor), such as those embodiments having a metal fastener anchor, the wood screw-type thread may prevent the stripped-out screw fastener 16 from solidly locking up with the fastener anchor 32 sufficiently enough to resist door weight and/or motion from loosening the stripped-out screw fastener again.

Figure 3:
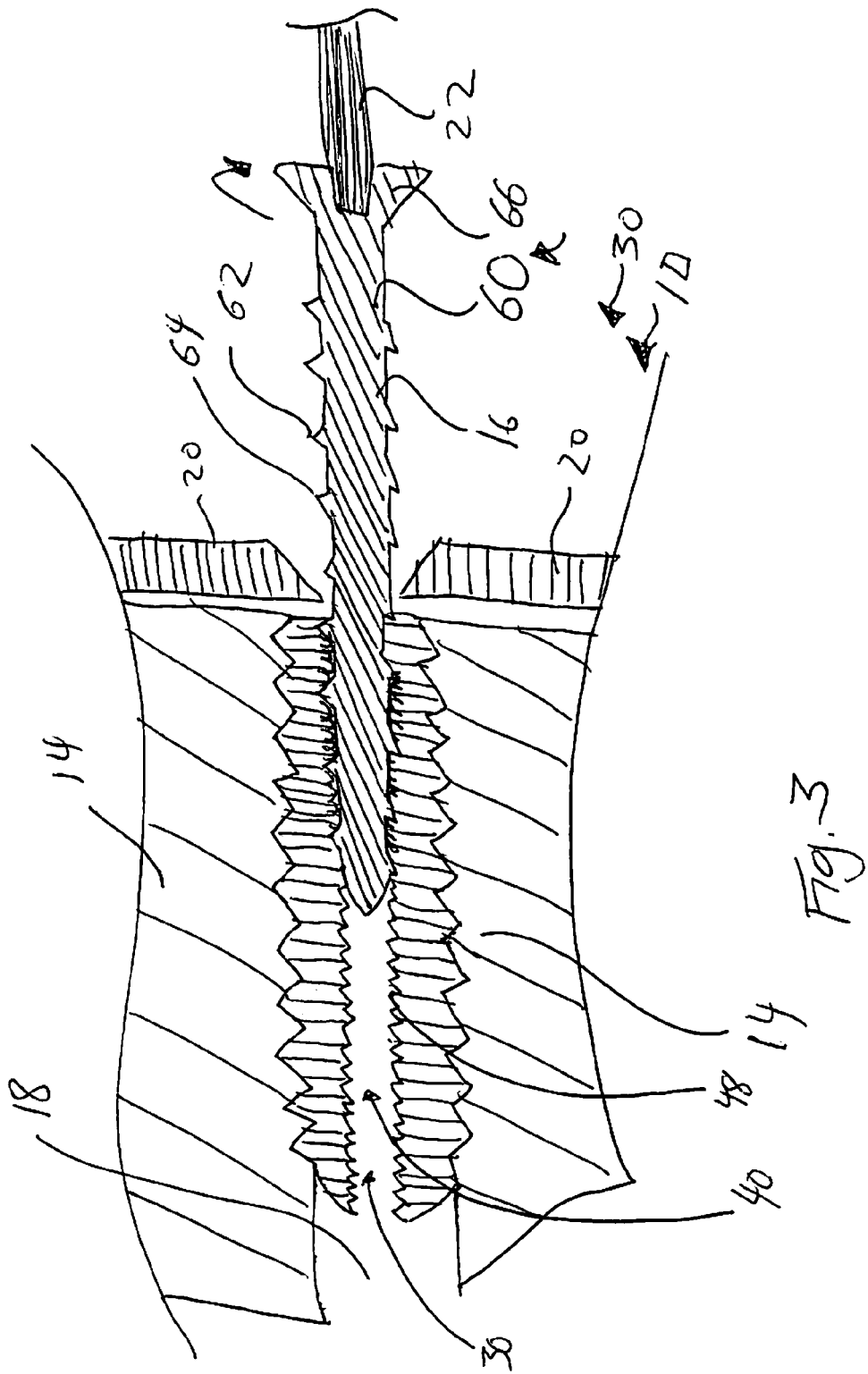
FIG. 3 is substantially a cutaway elevation view of one embodiment of the securing fastener being driven into the fastener anchor of the present invention.

As substantially shown in FIG. 3, one way to possibly solve this issue could be a version of the invention 10 that still uses the stripped-out screw fastener 16 as the securing fastener 60 and has a fastener anchor 32 that could be made from a resilient polymer having a channel thread 46 that is generally not complementary to the thread 64 of the securing fastener 60. In this manner, the channel thread 46 could have a higher threads per inch (TPI) count than that the thread 64 of the stripped-out screw fastener 16 being used as the securing fastener 60. The channel thread 46 and inside hollow interior's diameter could be such that as the stripped-out (metal) screw fastener 16 is being inserted into the hollow interior 38 (e.g., screwed into the threaded lengthwise center channel 40), the stripped-out (metal) screw fastener 16 engages and deforms (e.g., crushes) the polymer threads 46 of the threaded channel 40 to secure the stripped-out screw fastener 16 to the fastener anchor 32. This crushing of resilient polymer channel threads 46 could be sufficient to provide an attachment to the stripped-out screw fastener 16 that substantially resists those forces (e.g., door weight and movement) that might otherwise be able to loosening stripped-out screw fastener 16 from the respective fastener anchor 32.

Figure 4:
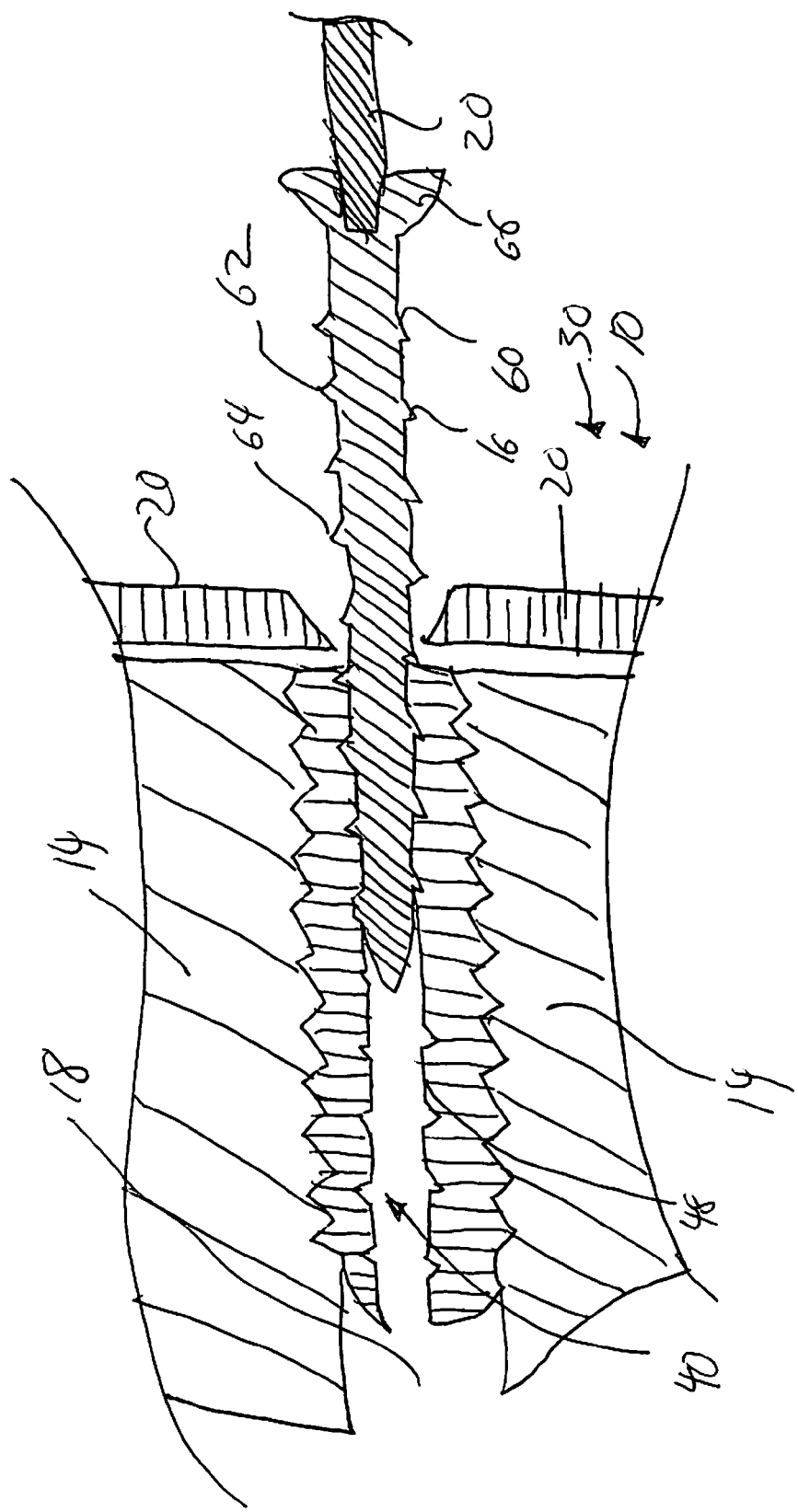
FIG. 4 is substantially a cutaway elevation view of another embodiment of the securing fastener being driven into the fastener anchor of the present invention.
Figure 5:
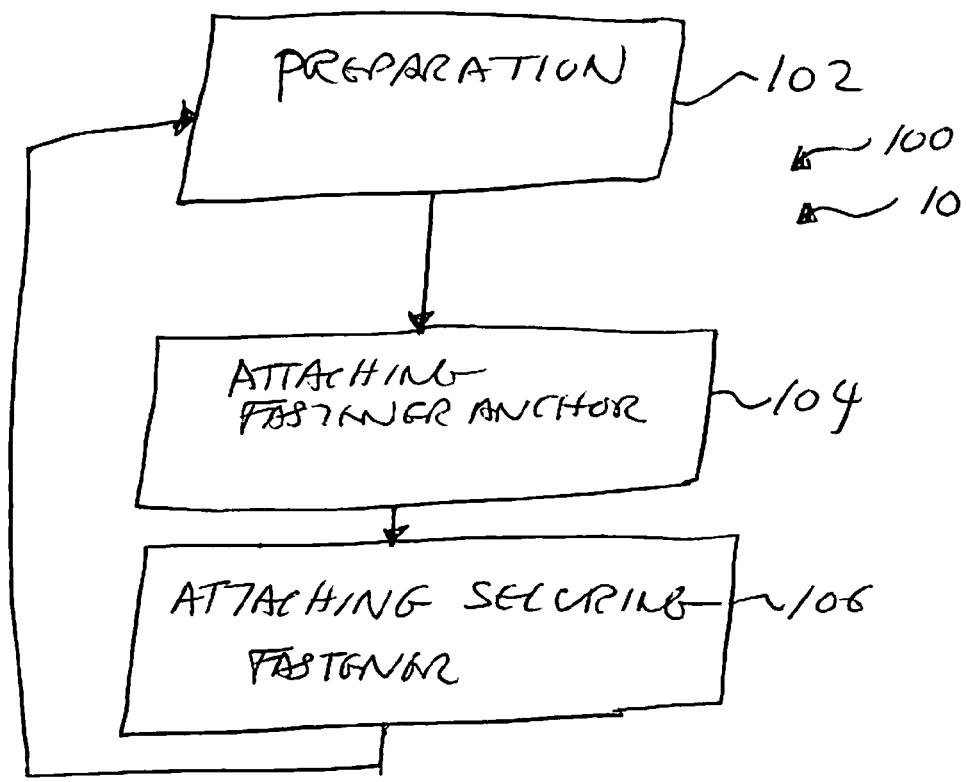
FIG. 5 is substantially a flowchart schematic showing one possible embodiment of a process/method for operating the present invention.
Figure 6:
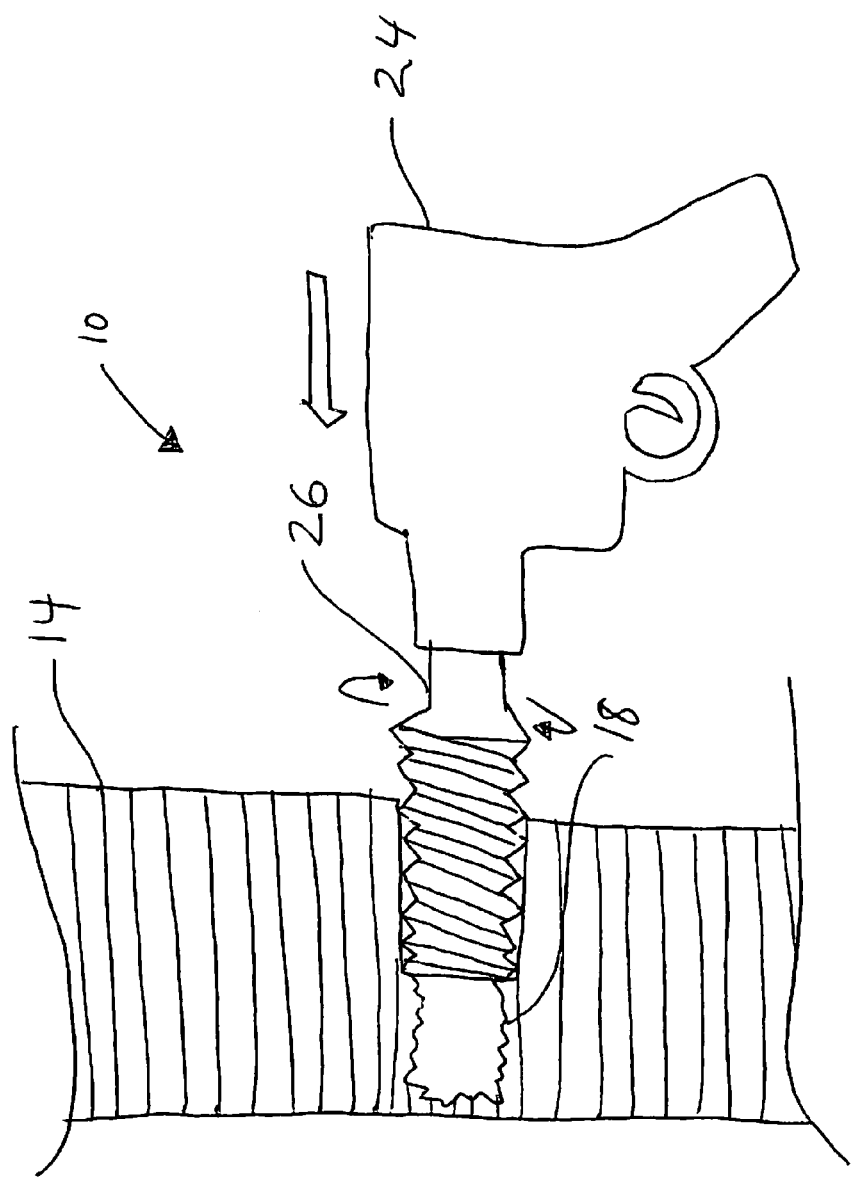
FIG. 6 is substantially showing a cutaway elevation drawing showing the enlargement of the stripped out screw hole.

As substantially shown in FIG. 4, another possible version that could solve this issue by having the securing fastener 60 and fastener anchor's channel thread 46 could both use the same thread. This could involve the use of a securing fastener 32 that is different to the stripped-out screw fastener (e.g., in generally having a different construction/thread) and using a fastener anchor 32 that has a channel thread 46 that is complementary/reciprocal to the securing fastener 60. (See FIG. 2.) These threads could be ones propounded by ASME (American Society of Mechanical Engineers.) The ASME based thread standards could provide for generally metal (application) screw thread that generally has a higher thread per inch (TPI) count and be considered a finer thread than the courser wood thread used on stripped-out fastener screws (e.g., wood application-type screw). When a metal thread is used to bind a securing fastener 60 to a metal fastener anchor 32, generally there is a greater binding capability exerted between the securing fastener 60 and the fastener anchor 32 that can be considered to more successful in resisting those forces (e.g., door weight and movement), which could otherwise loosen the securing fastener 60 from the fastener anchor 32.

The tapered end 42 could be used to initially load the fastener anchor 32 into the screw hole (after the screw hole had been properly enlarged.) In one possible embodiment, the tapered end 42 could be further enclosed at tapered end's tip to aid in the penetration of the fastener anchor 32 into the stripped out screw hole 16, especially if the fastener anchor 32 is significant larger that the enlarged screw hole 16. The fastener anchor (with the enclosed tapered end 42) could be used with softer wood products that are denoting or forming the stripped-out screw hole 16 requiring the fastener anchor 32 to have a more expansive and aggressive external side thread 50 to allow the fastener anchor 32 to better grip the softer wood product. The enclosed tapered end 42 could also further restrict the length of the threaded portion 62 of the securing fastener from exceeding the length of the threaded channel 40.

As noted above, the securing fastener 60 could have a head 66 that could top one end of a threaded portion 62. The head 66 could be shaped to receive a screw driver tip or a portion of a like rotating instrument 22 that can engage and rotate the securing fastener 60 into the fastener anchor 32. In certain circumstances, the head 66 could also be shaped to fit into an aperture of a hinge 20 that is substantially being used to movably attach the door 12 and frame 14 together.

The external side 36 of the hollow cylinder 34 could be threaded in manner that could allow the fastener anchor 32 to retain itself within the door 12 or frame 14 and to resist being pulled out of the door 12 or frame 14 due to the weight and/or movement of the respective door 12. Generally with an external side's thread 50 could be selected have a greater TPI (threads per inch) than the TPI of the channel thread 46. The TPI of the external thread 50 could be described as a wide wood screw type thread while the channel thread 46 could in various embodiments be a narrow machine screw type tread although the channel and external threads 46, 50 could vary as needed for a specific usage.

As substantially shown in FIGS. 5, 6, 7, 8 and 9 the method or process 100 of using the system 20 could start with step 102, preparation. In this step 102, the stripped-out screw fastener 16 could be removed from the stripped-out door/frame screw hole 18 (unless the screw fastener has already fallen out of the stripped-out screw hole 18.) The stripped-out screw hole 18 could be associated with anchoring a hinge 20 to a door 12 or frame 14 or the like.

A suitable fastener anchor 32 could be chosen for use in the particular repair. Various selection factors to be considered could be door weight; door composition; type of open and closing door motion; type of frame; type of frame material; type and size of screw fastener that original was used in the stripped-out screw hole; whether or not to reuse the stripped-out screw fastener 16 with the chosen fastener anchor and the like. Similarly, if needed a suitable securing fastener 60, should also be selected as a well using one or more of the above noted factors.

Other tools for the repair project could be acquired as needed. One such additional tool could include a drill 24 (or other suitable instrumentality) with appropriate bit 26 (e.g., drill, reamer or the like) for suitably enlarging the stripped-out screw hole 18 size; a rotating instrument(s) 22 (e.g., screwdriver) for engaging the fastener anchor 32 into the enlarged screw hole 18 and/or for engaging the securing fastener into the fastener anchor.

Once the suitable fastener anchor 32 and/or securing fastener 60 is procured along with the other needed tools, the drill 24 and drill bit 26 can then be used to suitably enlarge the stripped-out screw hole. The screw hole 18, so modified, could substantially match the external diameter of the hollow cylinder 34 (e.g., minus the external thread.) Once this step is substantially completed, the process 100 could proceed to step 104, attaching the fastener anchor to the enlarged screw hole.

In step 104, attaching the fastener anchor to the enlarged screw hole; the tapered end of the hollow cylinder 34 could be inserted into the enlarged or reamed out screw hole 18. A tip of the suitable rotating or driver instrument (screw driver, hex/Allen key, etc.) 22 could engage the other open end 44 to rotate the fastener anchor 32 down and into the enlarged screw hole 18. The rotating instrument 22 should be capable of generating sufficient torsional force or torque to overcome the resistance of external threads driving into the material of the door/frame forming the enlarged screw hole 18.) The fastener anchor 32 could be driven/rotated into the enlarged screw hole 18 until the other open end 44 is substantially flush with the surface of the door 12/frame 14. As this step is completed, the process could proceed to step 106, attaching the securing fastener to the fastener anchor.

In step 106, attaching the securing fastener to the fastener anchor, as needed the appropriate portion of the hinge 20 could be placed over the secured fastener anchor 32 so that the aperture (to which the screw fastener has originally secured the hinge) aligns up with the open other end and the threaded lengthwise center channel 32. Depending on which embodiment of the invention is being used, the securing fastener 60 (the stripped-out screw fastener, metal screw, etc.) could be inserted through the hinge aperture and into the threaded channel 32. A rotating instrument 22 (e.g., the same or different from the one used to rotate the fastener anchor into place) can place its tip into the head 66 of the securing fastener 60 to move (e.g., rotate) the securing fastener 60 into the threaded channel 40 to substantially secure the securing fastener 60 to the fastener anchor 32; the hinge 20 to the respective door 12 or frame 14, and the frame to the door.

Depending on the particular embodiment of the invention, the stripped-out screw fastener 18 could be used as the securing fastener. If the stripped-out screw fastener's thread does not match up with the channel thread 46, the stripped-out screw fastener 18 could have a crushing relationship with the channel thread 46, wherein the channel thread 46 is deformed in a manner to retain the screw fastener within the fastener anchor (see FIG. 3.) In another version, the channel thread of the fastener anchor is complimentary or reciprocal to the thread of the threaded portion of the stripped-out screw fastener. In yet another version, the stripped-out screw fastener is not used as the securing fastener and a separate screw fastener is designated to be the securing fastener. That separate screw fastener's threaded portion's thread could be reciprocal or complementary to the channel thread. (See FIG. 4.)

Once this step is substantially completed, the process 100 could return to step 102 for additional repair work as needed.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A repair system for re-securing a hinge or door to a frame when a screw fastener that originally used to secure the hinge to the door or the frame no longer engages and secures to a screw hole of the screw fastener in the door or the frame, comprising:

(A) a fastener anchor comprising a double open-ended hollow metal cylinder having a threaded exterior side, a hollow interior and two ends, the hollow interior further forming a center channel that is continuously threaded along an entire length of the center channel prior to the insertion of a securing fastener, the center channel further being continuously connected to the two ends, one open end being tapered while the remaining other open end being shaped to receive a portion of a rotating instrument;

(B) a securing fastener having a threaded portion that has a first thread that engages a second thread of the center channel to re-secure the door to its respective frame;

wherein the threaded exterior side is capable of engaging and securing the screw hole of the screw fastener in the door or the frame after the screw hole has been appropriately enlarged.

2. The repair system of claim 1 wherein the second thread of the center channel is complementary to the first thread of the threaded portion of the securing fastener.

3. The repair system of claim 1 wherein the second thread of the center channel is not complementary to the first thread of the threaded portion of the securing fastener.

4. The system of claim 1 wherein the first thread of the securing fastener crushingly engages the second thread of the center channel when the threaded portion is inserted into the center channel.

5. The repair system of claim 1 wherein the screw fastener that was originally used to secure the door to the respective frame is used as the securing fastener.

6. The system of claim 5 wherein the tapered open end can fit within the enlarged screw hole.

7. The repair system of claim 1 wherein a length of the center channel is same as or longer that a length of a threaded portion of the screw fastener.

8. The repair system of claim 1 wherein the fastener anchor is configured to be rotated by the rotating instrument to drive the fastener anchor into the enlarged screw hole.

9. A method of using a repair system for fully re-securing a door to a frame when a screw fastener that originally used to secure the door to the respective frame no longer engages and secures to a screw hole of the screw fastener in either the door or frame, comprising the following steps:

(A) providing the door movably attached to the frame by a set of screw fasteners, at least one screw fastener of the set of screw fasteners no longer attaches to a respective screw hole in the frame or door;

(B) providing a fastener anchor comprising a double open-ended hollow metal cylinder having a threaded exterior side, a hollow interior and two open ends, the hollow interior further forming a center channel that is continuously threaded along an entire length of the center channel prior to the insertion of a securing fastener, the center channel further being continuously connected to the two ends, one open end being tapered while the remaining other open end being shaped to receive a portion of a rotating instrument wherein the threaded exterior side is capable of engaging and securing to the screw fastener's screw hole after the screw hole has been appropriately enlarged;

(C) providing a securing fastener having a threaded portion that has a first thread that engages a second thread of the center channel to re-secure the door to its respective frame;

(D) enlarging the screw hole to accommodate the fastener anchor;

(E) rotating the fastener anchor into the enlarged screw hole; and (F) inserting the securing fastener into the threaded lengthwise center channel to fully re-secure the door to the respective frame.

10. The method of claim 9 wherein the inserting a securing fastener further comprises a step of engaging the center channel with the at least one screw fastener of the set of screw fasteners.

11. The method of claim 10 wherein the step of engaging the center channel with the at least one screw fastener of the set of screw fasteners further comprises crushingly engaging a thread of the center channel by the at least one screw fastener of the set of screw fasteners.

12. The method of claim 9 wherein the inserting a securing fastener further comprises a step of engaging the center channel with a securing screw fastener being a different fastener from the at least one screw fastener of the set of screw fasteners.

13. The method of claim 9 wherein the securing fastener has the same dimensions as the at least one screw fastener of the set of screw fasteners.

14. The method of claim 9 wherein the rotating a fastener anchor further comprises a step of inserting a portion of the rotating instrument into the other open end and a step of rotating the rotating instrument once the portion is inserted into the other open end.

15. The method of claim 14 wherein the inserting a securing fastener further comprises a step of rotating the securing fastener with a rotating instrument.

16. A combination of a hinge, a wood or wood composite door, a wood or wood composite frame and a repair system for re-securing the wood or wood composite door to the respective wood or wood composite frame, comprising:

(A) the door movably attached to the frame by one or more screw fasteners that penetrate through a hinge, one of the one or more screw fasteners no longer engaging and securing to a respective screw hole in either the frame or door;

(B) a fastener anchor comprising a double open-ended hollow metal cylinder having a threaded exterior side, a hollow interior and two ends, the hollow interior further forming a center channel that is continuously threaded along an entire length of the center channel prior to the insertion of a securing fastener, the center channel further being continuously connected to the two ends, one open end being tapered while the remaining other open end being shaped to receive a portion of a rotating instrument;

(C) the securing fastener having a threaded portion that has a first thread that engages a second thread of the center channel to re-secure the door to its respective frame;

wherein the threaded exterior side is capable of engaging and securing to the respective screw hole after the respective screw hole has been appropriately been enlarged to receive the fastener anchor, the securing fastener engages the center channel to re-secure the door to its respective frame.

17. The combination of claim 16 wherein the securing fastener is the one of the one or more screw fasteners.

* * * * *